United States Patent

Campbell et al.

[11] Patent Number: 5,414,057
[45] Date of Patent: May 9, 1995

[54] REDISTRIBUTION OF ORGANIC POLYCARBONATE COMPOSITIONS

[75] Inventors: Allen J. Campbell, Mt. Vernon, Ind.; David M. Dardaris, Ballston Spa, N.Y.; Gary R. Faler, Scotia, N.Y.; Patrick J. McCloskey, Watervliet, N.Y.; Thomas L. Evans, Washington, W. Va.

[73] Assignee: General Electric Company, Schenectady, N.Y.

[21] Appl. No.: 159,691

[22] Filed: Dec. 1, 1993

Related U.S. Application Data

[63] Continuation-in-part of Ser. No. 992,370, Dec. 17, 1992, abandoned, which is a continuation-in-part of Ser. No. 968,946, Oct. 30, 1992, abandoned.

[51] Int. Cl.$^6$ ............................................. C08F 283/02
[52] U.S. Cl. .................................. 525/462; 525/469; 528/196; 528/491; 528/492; 528/485; 528/486; 528/487; 528/488; 528/490; 528/502
[58] Field of Search ................. 525/462, 469; 528/196, 528/491, 492, 485, 486, 487, 488, 490, 502

[56] References Cited

U.S. PATENT DOCUMENTS 5,021,521  6/1991  Krabbenhoft et al. ............. 525/462

FOREIGN PATENT DOCUMENTS 0378858  12/1989  European Pat. Off. .
0400478   5/1990  European Pat. Off. .

Primary Examiner—John Kight, III
Assistant Examiner—Terressa M. Mosley
Attorney, Agent, or Firm—William H. Pittman

[57] ABSTRACT

A process for the redistribution of an organic polycarbonate composition. The process involves melt equilibrating a starting polycarbonate composition (which may be a single polycarbonate or a mixture of polycarbonates, and may be or include recycled polycarbonate) having an initial weight average molecular weight in the presence of a carbonate redistribution catalyst and in the absence of branching agents, under conditions such that a redistributed polycarbonate composition is formed having a weight average molecular weight different from, and typically lower than, the initial weight.

17 Claims, No Drawings

REDISTRIBUTION OF ORGANIC POLYCARBONATE COMPOSITIONS

This application is a continuation-in-part of application Ser. No. 07/992,370, filed Dec. 17, 1992, now abandoned, which in turn is a continuation-in-part of application Ser. No. 07/968,946, filed Oct. 30, 1992, now abandoned.

The present invention relates to the redistribution of organic polycarbonate compositions. The term "redistribution" is defined as the process of reforming an initial polycarbonate composition having an initial weight average molecular weight into a redistributed polycarbonate composition having a weight average molecular weight which is different from the initial molecular weight.

Polycarbonates are well known high performance engineering thermoplastics characterized by many advantageous physical properties, such as high optical clarity, toughness, dimensional stability and excellent impact strength over a wide temperature range.

Polycarbonates are typically prepared by a heterogeneous interfacial polymerization method. Usually an organic bishydroxy compound, such as 2,2-bis(4-hydroxyphenyl)propane ("bisphenol A"), is reacted with a carbonate precursor, such as phosgene, in the presence of an interfacial polycarbonate condensation catalyst. This process is conducted in a mixed aqueous-organic system which results in recovery of the polycarbonate in the organic phase. A chain terminating agent, such as a monofunctional phenol, is employed to control molecular weight. Accordingly, different grades of polycarbonates characterized primarily by different weight average molecular weights can be prepared by varying the amount of chain terminating agent.

In an industrial plant the different commercial grades of interfacially prepared polycarbonates are usually manufactured in campaigns. The transition from one grade of polymer to another results in a significant amount of variable molecular weight material until the system becomes completely purged of the prior grade. Transition grade materials must be inventoried and later matched and blended with other grades of polymer to obtain a grade with commercially acceptable properties. Often there are inconsistencies between the properties of transition grade batches, therefore matching and blending may vary from batch to batch.

It is also desirable to provide processes for recycling scrap polymers, including polycarbonates. Recycling processes have become of increasing importance in the last few years, as one way to minimize the volume of waste material which must be disposed of in landfills or the like.

In view of the above, it would be desirable to provide a practical method of reforming polycarbonates, including used polycarbonates and newly interfacially prepared polycarbonate compositions having an initial weight average molecular weight, into a variety of commercial grade polycarbonate compositions characterized primarily by different molecular weights. Such a process would eliminate interfacially prepared transition grade polycarbonates and the aforementioned problems which transition grades present, and would also permit recycle of scrap and post-consumer polycarbonate.

The invention is a process for the redistribution of an organic polycarbonate composition. As noted hereinbefore, the term "redistribution" refers to a process of reforming an initial polycarbonate composition having an initial weight average molecular weight into a redistributed polycarbonate composition having a different molecular weight. The process comprises melt equilibrating an initial organic polycarbonate composition having a linear or branched structure in a mixture which includes a catalytic amount of a polycarbonate redistribution catalyst under reaction conditions such that a redistributed organic polycarbonate composition is formed. The process of this invention is conducted in the absence of branching agents, identified hereinafter.

In a second aspect of this invention, a diaryl carbonate may be added to the above-identified initial polycarbonate composition, and the resulting mixture comprising the initial organic polycarbonate and the diaryl carbonate may be melt equilibrated in the presence of a catalytic amount of a polycarbonate redistribution catalyst under reaction conditions such that a redistributed organic polycarbonate composition is formed.

Advantageously, the process of this invention is practical and therefore suitable for industrial manufacturing plants. Specifically, the process of this invention allows for the plant production of a single grade of interfacially prepared organic polycarbonate. This single grade of polymer may then be reformed before leaving the plant via the process of this invention into various commercial grade polycarbonates. The process of this invention eliminates inventories of interfacially prepared transition grade polycarbonates. Moreover, the process eliminates the need to match and blend transition grades of polycarbonates to produce a commercial product. Problems arising from inconsistencies between transition grade polycarbonates are also eliminated.

Even more advantageously, the process of this invention can be controlled to produce a polycarbonate composition of any selected molecular weight within the known range for such polymers. In addition, the redistributed polycarbonate composition exhibits improved melt stability when compared with the interfacially prepared initial polycarbonate composition.

Any linear or branched organic polycarbonate composition is an acceptable starting material for the redistribution process of this invention. Suitable organic polycarbonates include aromatic and aliphatic polycarbonates. Preferably, the initial polycarbonate composition is an aromatic polycarbonate.

Typically, the weight average molecular weight of the polycarbonate starting composition may range from values as low as 500 to values as high as 200,000, as measured by gel permeation chromatography using polystyrene as the reference material. Preferably, the weight average molecular weight of the polycarbonate starting composition ranges from about 5,000 to about 100,000, more preferably, from about 25,000 to about 65,000.

Linear aromatic polycarbonates can be obtained commercially, for example, from General Electric Company as Lexan ® brand OQ1020, 100, 105, 125, 135 and 145 polycarbonates. Alternatively, linear aromatic polycarbonates can be prepared by any of the usual procedures for making these materials, for example, by interfacial phosgenation of a dihydroxy aromatic compound or by interfacial polymerization of a mixture of aromatic oligomers, such as bischloroformates, monohydroxy monochloroformates, and/or bis-hydroxy-terminated polycarbonate oligomers, known to those skilled in the art.

Typical examples of dihydroxy aromatic compounds suitable for the preparation of linear aromatic polycarbonates useful as starting materials for the process of this invention are described in U.S. Pat. No. 4,727,134, relevant portions of the disclosure of which are incorporated herein by reference. Dihydroxy compounds disclosed therein include bisphenol A, as well as bis(4-hydroxyphenyl)methane, 1,1-bis(4hydroxyphenyl)cyclohexane, bis(4-hydroxyphenyl)diphenylmethane, 4,4'-dihydroxybiphenyl, 2,6-dihydroxynaphthalene, resorcinol, and 2,2-bis(3,5-dichloro-4-hydroxyphenyl)propane. Dihydroxy aromatic compounds of the bisphenol A type, and especially bisphenol A, are preferred for their particular suitability in preparing linear aromatic polycarbonate compositions useful for the process of this invention.

In the event that an aromatic polycarbonate copolymer rather than a homopolymer is desired to be redistributed according to the process of this invention, two or more different dihydroxy aromatic compounds may be employed in the preparation of the copolymer. Alternatively, a copolymer of a dihydroxy aromatic compound with a glycol, such as propylene glycol, or with a hydroxy or acid terminated polyester, or with a dibasic acid may be prepared and used in the redistribution process. Further, blends of aromatic polycarbonate homopolymer with any of the above-described copolymers may be employed as the initial organic polycarbonate composition in the process of this invention.

Carbonate precursors which can be reacted with the dihydroxy aromatic compound for production of the linear aromatic polycarbonates are well known and described for example in U.S. Pat. Nos. 4,469,861 and 4,431,793, relevant portions of the disclosures of which are incorporated herein by reference. Illustrative examples of such precursors include carbonyl halides, diaryl carbonate esters and haloformates. The carbonyl halides can be carbonyl chloride, carbonyl bromide and mixtures thereof. Typical of the diaryl carbonate esters which can be employed are diphenyl carbonate; di(-halophenyl) carbonates, such as di(chlorophenyl) carbonate, di(bromophenyl) carbonate, di(trichlorophenyl) carbonate, and the like; as well as di(alkylphenyl) carbonates, such as di(tolyl) carbonate. Also suitable are di(naphthyl)carbonate, di(halonaphthyl) carbonates, phenyl alkylphenyl carbonates such as phenyl tolyl carbonate; halophenyl halonaphthyl carbonates such as chlorophenyl chloronaphthyl carbonate, and the like; and mixtures of any of the foregoing. The haloformates suitable for preparing linear aromatic polycarbonates include mono- and bischloroformates of dihydric phenols, such as the monochloroformate of bisphenol A and the bischloroformate of hydroquinone; as well as the bishaloformates of glycols, for example, bishaloformates of ethylene glycol, neopentyl glycol, or polyethylene glycol. While other carbonate precursors will be recognized by those skilled in the art, carbonyl chloride, also known as phosgene, is generally preferred.

In utilizing the interfacial polymerization process to prepare linear aromatic polycarbonates, the dihydroxy aromatic compound is dissolved in an alkali metal salt solution, for example, aqueous sodium hydroxide, and thereafter a water-immiscible solvent, such as methylene chloride, dichloroethane or chlorobenzene, is added. After introducing the carbonate precursor, for example phosgene, at room temperature, the polycarbonate intermediates are then isolated directly from the organic phase by distilling off the solvent or by precipitation.

The chain length of the polycarbonate product substrates and thus the desired molecular weight can be adjusted and regulated by adding a chain terminating agent or chain stopper to the reaction mixture. Suitable chain stoppers include monofunctional phenols, such as, unsubstituted phenol, m- and p-methylphenol, m- and p-ethylphenol, m- and p-propylphenol, m- and p-isopropylphenol, m-bromophenol, p-butylphenol, p-t-butylphenol and p-cumylphenol. The addition of this agent is usually made prior to the addition of the carbonate precursor, but can be made at any time up to the point of reaction wherein the degree of polymerization approaches that of a high polymer.

The quantity of chain terminating agent which can be added to prepare the linear aromatic polycarbonates is an amount effective to prepare substrates having a weight average molecular weight in the range preferably from about 5,000 to about 100,000. This amount will vary as a function of the mole percent of aromatic dihydroxy compound employed in the reaction.

Linear polycarbonate compositions, which are employed as starting materials for the process of this invention, are preferably composed of structural units of the formula:

wherein at least about 60 percent of the total number of R groups are aromatic organic radicals and the balance thereof are aliphatic, alicyclic, or aromatic radicals. Preferably, R is an aromatic organic radical and more preferably a radical of the formula:

wherein each A1 and A2 is a monocyclic divalent aryl radical and Y is a bridging radical in which one or two carbon atoms separate A1 and A2. Such radicals frequently are derived from aryl dihydroxy compounds of the formula HO—A1—Y2—A2—OH, such as those mentioned hereinbefore. For example, A1 and A2 generally represent unsubstituted phenylene and substituted derivatives thereof. The bridging radical Y is most often a hydrocarbon group and particularly, a saturated group such as methylene, cyclohexylidene, or isopropylidene.

As mentioned previously herein, branched aromatic polycarbonates may also used as the starting composition to be redistributed in the process of this invention. Any of the commercially available branched aromatic polycarbonates may be used, such as those disclosed in U.S. Pat. Nos. 3,541,049; 3,799,953; 4,185,009; 4,469,861; and 4,431,793; all of which are incorporated by reference herein in their entirety.

Commercially available branched polycarbonates are prepared in interfacial polymerization processes wherein a branching agent, such as a polyhydric phenol having more than two hydroxy groups in the molecule, is reacted with an aromatic dihydroxy compound and a carbonate precursor in the presence of a chain terminating or molecular weight controlling agent. Suitable polyhydric phenols are disclosed in the references cited above, and include, for example, 1,1,1-tris-(4-hydroxyphenyl)ethane (THPE), 1,3,5-tris-(4-hydroxyphenyl)-benzene, 1,4-bis(4',4"-dihydroxytriphenylmethyl)benzene and the like. Other suitable branching agents include cyanuric chloride disclosed in U.S. Pat. No. 3,541,049; branched dihydric phenols, such as those disclosed in U.S. Pat. No. 4,469,861; 3,3-bis(4-hydroxyaryl)oxindoles disclosed in U.S. Pat. No. 4,185,009; and aromatic polycarbonates end-capped with branched alkyl acyl halide and/or acids, such as those disclosed in U.S. Pat No. 4,431,793, all references being cited and incorporated by reference hereinbefore. Another suitable branching agent is trimellitic triacid chloride.

The aromatic dihydroxy compounds, carbonate precursors, and chain terminating or molecular weight controlling agents recited previously hereinabove for use in the preparation of linear aromatic polycarbonates are also suitable for preparation of branched aromatic polycarbonates.

In accordance with the process of this invention, any of the above-identified polycarbonates having an initial weight average molecular weight typically in the range from about 5,000 to about 100,000 may be reformed into a final polycarbonate composition having a different molecular weight. Included are mixtures of different linear or branched polycarbonates and mixtures of linear and branched polycarbonates. The process is particularly useful with recycled polycarbonates, whether linear or branched, including polymers formulated into such products as optical disks (usually linear) and blow-molded bottles (usually branched).

The redistribution process involves melt equilibrating the starting composition in the presence of a carbonate redistribution catalyst. Melt equilibration involves heating the polymer at a temperature sufficient to produce a melt for a time sufficient to achieve redistribution equilibrium. Typically, when the starting material is a single homopolymer or copolymer, redistribution converts the starting polycarbonate into a redistributed polycarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

It is noted that the redistribution process of this invention is not intended to incorporate into the starting materials branching agents. Examples of such branching agents are trimellitic anhydride acid chloride, cyanuric chloride and phenolic compounds such as 1,1,1-tris(4-hydroxyphenyl)ethane. Branching agents of this type will be recognized by those skilled in the art of polycarbonate synthesis and are described in U.S. Pat Nos. 5,021,521 and 5,097,008. Such branching agents are known to equilibrate with linear aromatic polycarbonate compositions to form branched aromatic polycarbonate compositions.

Suitable carbonate redistribution catalysts include a wide variety of bases and Lewis acids. Illustrative examples include, amines, particularly 1,3-dimethylaminopropane, imidazole, benzimidazole, and benzotriazole, as well as other organic bases, for example tetraalkylammonium hydroxides, such as tetramethylammonium hydroxide, usually as the pentahydrate, and tetraethylammonium hydroxide; tetraalkylammonium phenoxides, such as tetramethylammonium phenoxide, usually as the monohydrate; tetraalkylammonium acetates, such as tetramethylammonium acetate; tetraalkylammonium tetraphenylborates, such as tetramethylammonium tetraphenylborate; as well as lithium stearate, the lithium salt of bisphenol A, the tetraethylammonium salt of bisphenol A, sodium phenoxide, and the like. Other suitable organic bases include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis[(dibutyl)(phenoxy)tin] oxide, and tributyltin hydride; as well as organotitanium compounds, such as titanium tetra(isopropoxide), titanium tetra(5-methylheptoxide), and titanium tetra(butoxide); as well as, zirconium tetra(isopropoxide), aluminum tri(ethoxide), aluminum tri(phenoxide), mercuric acetate, lead acetate, (diphenyl)mercury, (tetraphenyl)lead, and (tetraphenyl)silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethylammonium borohydride, tetra(n-butylammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide. Preferably, the catalyst is a tetraalkylammonium base, such as a tetraalkylammonium hydroxide, acetate, or phenoxide. More preferably, the catalyst is a tetraalkylammonium hydroxide, wherein each alkyl moiety contains from 1 to about 16 carbon atoms, more preferably, from 1 to about 10 carbon atoms, and most preferably, from 1 to about 4 carbon atoms.

The amount of carbonate redistribution catalyst employed in in the process of this invention may be any amount which is effective in promoting the redistribution process. Usually the effective amount will depend upon the particular catalyst employed, the reaction rate desired, the particular molecular weight desired in the redistributed composition, and to a lesser extent on the chemical nature of the particular starting polycarbonate composition. Depending upon such variables, an effective amount of catalyst can easily be determined without undue experimentation. It is preferred that when the catalyst is a tetraalkylammonium hydroxide, the amount of catalyst ranges from about 15 ppm to about 1000 ppm based upon the amount of starting polycarbonate. More preferably, the amount of such catalyst ranges from about 30 ppm to about 180 ppm.

Optionally, a diaryl carbonate may be added to the starting polycarbonate composition to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate employed in the process of this invention may be any amount which provides the desired molecular weight in the redistributed polycarbonate composition. Usually, the amount of diaryl carbonate is no greater than about 1.5 weight percent based upon the amount of starting polycarbonate, more preferably, no greater than about 1.0 weight percent.

The redistribution process of this invention can be effected by dry mixing the starting organic polycarbonate, the carbonate redistribution catalyst, and optionally, the diaryl carbonate, and melt equilibrating the resulting mixture at a temperature ranging from about 180° C. to about 320° C. Preferably, the temperature ranges from about 250° C. to about 300° C. Typical melt processing techniques include melt condensation in a Helicone reactor for approximately 5 to 30 minutes, or continuous extrusion through a single screw or twin screw extrusion device. One skilled in the art will recognize that if extrusion is employed, the screw speed and feed rate may vary. During heating, it may be necessary to vent gases formed during decomposition of the carbonate redistribution catalyst.

Generally, the redistribution process of this invention is allowed to proceed to its thermodynamic endpoint, which is usually determined by one of two methods. In the first, the dispersivity, which is defined as the ratio of weight average molecular weight to number average molecular weight, is tracked with respect to time. Typically, the dispersivity decreases as the redistribution process progresses until at the apparent thermodynamic endpoint the dispersivity levels off.

A second method for determining the thermodynamic endpoint utilizes an observed shift in the distribution of low molecular weight oligomers. Polycarbonates prepared interfacially using tertiary amines as catalysts, regardless of the grade, have a weight ratio of cyclic trimer to cyclic hexamer (hereinafter "T/H ratio") of approximately 1.0, reflecting the kinetic nature of the synthesis. As the redistribution of interfacially prepared polycarbonates progresses, the proportion of low molecular weight oligomer is reduced and that of cyclic hexamer decreases with respect to that of cyclic trimer, resulting in an increase in T/H ratio. The magnitude of the increase varies with the quantity of catalyst employed. Generally, increasing amounts of catalyst are proportional to increasing T/H ratio. As the process approaches thermodynamic equilibrium, the T/H ratio levels off typically at a number larger than 3.0. Accordingly, the T/H ratio may be employed not only to determine the thermodynamic endpoint of the redistribution process, but to determine a sample's process history, i.e., whether a sample has been prepared interfacially or by the redistribution process described herein.

It is an advantage of the process of this invention that the molecular weight of the redistributed polycarbonate composition may be controlled to a fine degree. Control is generally obtained simply by varying the amounts of carbonate redistribution catalyst and diaryl carbonate employed in the redistribution process.

In such a manner, it is possible to obtain from a single interfacially prepared polycarbonate composition a variety of lower molecular weight redistributed compositions heretofore available only by interfacial polymerization methods. Thus, the redistribution of commercial grades of linear aromatic polycarbonate via the process of this invention yields a variety of lower molecular weight polycarbonates currently available only by interfacial polymerization methods.

It is also possible to redistribute a mixture of high and low molecular weight polycarbonates to obtain a polycarbonate of intermediate molecular weight. The latter generally have narrower molecular weight distributions, as represented by dispersivity (Mw/Mn), and lower melt viscosities than simple blends of the high and low molecular weight resins. Mixtures of linear and branched resins may also be redistributed. Finally recycled polycarbonates, as illustrated by the linear optical disk grades and the branched blow molding grades, may be redistributed individually or in admixture; the products have the high ductility of the non-redistributed simple blends as well as other desirable properties.

Another advantage of the redistribution process of this invention is that the redistributed polycarbonate compositions exhibit improved melt stability when compared with the interfacially prepared starting polycarbonates. Melt stability can be ascertained by measuring the difference in the molecular weight of a polymer before and after heating in a Tinius Olsen Extrusion Plastometer. More stable compositions will exhibit less change in molecular weight. In addition, more stable compositions will exhibit less change in the T/H ratio.

Redistributed polycarbonate compositions may be further improved when compared with interfacially prepared compositions in that the redistributed compositions often show lower concentrations of total polycarbonate lows. For the purposes of this invention total polycarbonate lows are defined as the soluble material isolated from a standard procedure comprising (a) adding acetonitrile to a chloroform solution containing 20 weight percent polycarbonate resin until precipitation is complete, (b) removing the precipitate, and (c) isolating the lows from the mother liquor. In addition, redistributed polycarbonate compositions may be improved when compared with interfacially prepared compositions in that the redistributed compositions show lower concentrations of residual diaryl carbonate, except in such instances wherein a large amount of diaryl carbonate is added to the redistribution process itself.

The following examples are illustrative of the process of this invention. Molecular weights were determined by gel permeation chromatography relative to polystyrene.

EXAMPLE 1

Interfacially prepared commercial bisphenol A polycarbonate polymer (1400 g; General Electric) was dried in a hot air oven at 115° C. from 4 to 12 hr. Tetramethylammonium hydroxide as the pentahydrate (mp. 65°–68° C.) and optionally diphenyl carbonate (DPC) were added to the dried polycarbonate polymer.

The resulting mixture was agitated in a Henschel mixer for 30 seconds to ensure that the sample was homogeneous. Thereafter, the mixture was extruded at 260° C. on a W&P 28 mm Twin Screw extruder to yield a redistributed polycarbonate composition. The extrusion was performed at a feed rate of 8 to 10 lbs/hr and at screw speeds between 300 and 325 rpm, and further conducted under vacuum venting so as to remove trimethylamine which was formed on decomposition of the catalyst. Weight average (Mw) and number average molecular weights were measured by gel permeation chromatography, using polystyrene as a reference material. Dispersivity (d) was calculated as the ratio of weight average molecular weight to number average molecular weight. The T/H ratio was measured by liquid phase chromatography. The percentage capping (% Cap), taken as the percentage of hydroxyl capped endgroups, was measured by infrared spectroscopy. Residual diaryl carbonate (DAC) was measured by liquid chromatography. The weight percentage of low molecular weight oligomers (lows) was calculated from the weight of soluble material isolated from an acetonitrile precipitation of a 20 weight percent solids solution of polycarbonate in chloroform. For comparative purposes, similar data is provided for untreated polycarbonate, and for polycarbonate extruded in the absence of catalyst and diphenyl carbonate. Results are set forth in Table I.

seen to decrease with increasing catalyst concentration. Residual diaryl carbonate concentration in the redistributed compositions is low at low levels of added diphenyl carbonate, but increases as the level of diphenyl carbonate increases.

EXAMPLE 3

The commercial polycarbonate of Example 1 was

TABLE I

| Sample | TMAH ppm | DPC wt % | Mw × $10^{-3}$ | T/H ratio | d | % Cap | % Lows | DAC ppm |
|---|---|---|---|---|---|---|---|---|
| 1* | 0 | 0 | 55.0 | 1.0 | 2.83 | 100 | 2.04 | 424 |
| 2** | 0 | 0 | 51.0 | 1.0 | 2.66 | 98+ | 1.90 | 137 |
| 3 | 90 | 0 | 43.0 | 2.6 | 2.60 | 85 | 1.50 | 95 |
| 4 | 90 | 0.29 | 38.2 | 3.3 | 2.62 | — | 1.62 | 173 |
| 5 | 90 | 0.57 | 36.0 | 2.8 | 2.64 | — | 1.86 | 337 |
| 6 | 90 | 1.13 | 31.3 | 2.8 | 2.77 | 89 | 2.29 | 846 |
| 7 | 180 | 0 | 38.7 | 3.7 | 2.63 | 76 | 1.46 | 62 |
| 8 | 180 | 0.29 | 34.4 | 3.0 | 2.63 | — | — | — |
| 9 | 180 | 0.57 | 32.2 | 3.5 | 2.67 | — | — | — |
| 10 | 180 | 1.13 | 28.0 | 3.5 | 2.69 | — | — | — |
| 11 | 270 | 0 | 35.0 | 4.5 | 2.55 | 73 | 1.58 | 196 |
| 12 | 270 | 0.29 | 32.0 | 3.9 | 2.57 | — | 1.84 | 374 |
| 13 | 270 | 0.57 | 28.8 | 3.6 | 2.64 | — | 2.13 | 556 |
| 14 | 270 | 1.13 | 25.6 | 3.4 | 2.56 | — | 2.39 | 876 |

*Untreated polycarbonate.
**Untreated polycarbonate after extrusion.

It is seen that tetramethylammonium hydroxide catalyzes the redistribution of commercial polycarbonate. Increasing the amounts of catalyst and diphenyl carbonate lead to decreasing molecular weight and increasing T/H ratio in the redistributed polymer. The dispersivity and percentage endcapping in the redistributed compositions are lower than in the interfacially prepared starting material. At a constant level of diphenyl carbonate, dispersivity is seen to decrease with increasing catalyst concentration. At lower catalyst and diphenyl carbonate levels, the total lows and residual diaryl carbonate in the redistributed compositions are lower than in the interfacially prepared starting material.

EXAMPLE 2

A second grade of interfacially prepared commercial bisphenol A polycarbonate was redistributed according to the procedure of Example 1 with the results shown in Table II.

redistributed according to the procedure of Example 1 with the exception that tetramethylammonium phenoxide (TMAP), as the monohydrate, was employed as the catalyst instead of tetramethylammonium hydroxide as the pentahydrate. Results are given in Table III. For comparative purposes, three data points from Example 1 (corresponding to Table I, entries 3, 7, and 11), wherein tetramethylammonium hydroxide pentahydrate was employed as the catalyst, are reproduced in Table III.

TABLE III

| Catalyst | Catalyst ppm | DPC wt % | Mw × $10^{-3}$ | $C_3/C_6$ | % Cap | % Lows | DAC ppm |
|---|---|---|---|---|---|---|---|
| TMAH: | | | | | | | |
| 1* | 90 | 0 | 43.3 | 2.6 | 85 | 1.50 | 95 |
| 2** | 180 | 0 | 38.7 | 3.7 | 76 | 1.46 | 62 |
| 3 | 270 | 0 | 35.0 | 4.5 | 73 | 1.58 | 196 |
| TMAP: | | | | | | | |

TABLE II

| Sample | TMAH ppm | DPC wt % | Mw × $10^{-3}$ | T/H ratio | d | % Cap | % Lows | DAC ppm |
|---|---|---|---|---|---|---|---|---|
| 1* | 0 | 0 | 66.0 | 1.0 | 3.04 | 98+ | 2.15 | 351 |
| 2** | 0 | 0 | 66.0 | 1.1 | 2.99 | 98+ | 1.99 | 144 |
| 3 | 15 | 0 | 56.0 | 1.3 | 2.98 | 98 | 1.60 | 115 |
| 4 | 30 | 0 | 50.9 | 1.7 | 2.90 | 94 | 1.44 | — |
| 5 | 45 | 0 | 48.1 | 1.9 | 2.85 | 89 | 1.36 | 106 |
| 6 | 60 | 0 | 47.9 | 2.1 | 2.82 | 89 | 1.32 | 104 |
| 7 | 90 | 0 | 43.1 | 3.1 | 2.78 | 83 | 1.26 | 78 |
| 8 | 180 | 0 | 41.1 | 3.7 | 2.60 | 76 | 1.35 | 60 |
| 9 | 270 | 0 | 41.1 | 4.3 | 2.62 | 72 | 1.42 | 60 |
| 10 | 180 | 0.28 | 35.0 | 4.7 | 2.73 | 84 | 1.33 | 77 |
| 11 | 180 | 0.56 | 31.2 | 4.7 | — | 87 | 1.57 | 144 |
| 12 | 180 | 1.13 | 27.1 | 5.1 | — | 91 | 1.77 | 250 |

*Untreated polycarbonate.
**Untreated polycarbonate after extrusion.

It is seen that tetramethylammonium hydroxide catalyzes the redistribution of this grade of polycarbonate. Increasing amounts of catalyst and diphenyl carbonate lead to decreasing molecular weight and increasing T/H ratio in the redistributed polymer. Typically, the dispersivity, percentage endcapping, and percentage lows in the redistributed compositions are lower than those in the interfacially prepared starting material. At a constant level of diphenyl carbonate, dispersivity is

| 4 | 30 | 0 | 51.2 | 1.4 | 98 | 1.78 | 149 |
| 5 | 60 | 0 | 49.0 | 1.9 | 97 | 1.57 | 118 |
| 6 | 90 | 0 | 48.7 | 2.3 | 96 | 1.50 | 109 |
| 7 | 180 | 0 | 46.4 | 2.9 | 95 | 1.47 | 100 |
| 8 | 270 | 0 | 44.1 | 3.1 | 94 | 1.32 | 84 |
| 9 | 90 | 0.29 | 42.9 | 2.1 | 95 | 1.65 | 207 |
| 10 | 90 | 0.57 | 41.0 | 1.9 | 97 | 1.92 | 482 |
| 11 | 90 | 0.86 | 35.3 | 2.0 | 98 | 2.08 | 874 |
| 12 | 180 | 0.29 | 40.9 | 3.0 | 95 | 1.49 | 230 |
| 13 | 180 | 0.57 | 35.1 | 4.1 | 94 | 1.67 | 336 |

TABLE III-continued

| Catalyst | Catalyst ppm | DPC wt % | Mw × 10⁻³ | C₃/C₆ | % Cap | % Lows | DAC ppm |
|---|---|---|---|---|---|---|---|
| 14 | 180 | 0.86 | 33.5 | 2.9 | 95 | 1.98 | 517 |

It is seen that tetramethylammonium phenoxide also catalyzes the redistribution of this grade of polycarbonate. Increasing amounts of catalyst and diphenyl carbonate lead to decreasing molecular weight and typically increasing T/H ratio in the redistributed polymer. When Entry 6 in Table III is compared with Entry 1, it is observed that the redistribution catalyst containing a greater concentration of water, i.e. the pentahydrate, achieves a higher degree of redistribution, as reflected in the lower molecular weights and higher T/H ratios of the redistributed compositions, than the monohydrate. Similar conclusions can be drawn when Entry 7 is compared with Entry 2 and Entry 8 is compared with Entry 3. These results suggest that base catalyzed carbonate hydrolysis is in part responsible for the redistribution process.

EXAMPLE 4

A third and a fourth grade (designated 3 and 4) of interfacially prepared bisphenol A polycarbonate (1400 g; General Electric) were dried in a hot air oven at 115° C. from 4 to 12 hr. Tetramethylammonium hydroxide as the pentahydrate and optionally diphenyl carbonate were added to the dried polycarbonate polymers.

The resulting mixtures were agitated in a Henschel mixer and extruded as in Example 1. The weight average molecular weights and T/H ratios of the redistributed polycarbonates were measured as in Example 1. The melt stabilities of the redistributed polycarbonates were ascertained by heating the compositions in a Tinius Olsen Extrusion Plastometer at 300° C. for 12 minutes. Thereafter, the measurements of molecular weight and T/H ratio were repeated. As control experiments, the molecular weights and T/H ratios of these grades of interfacially prepared polycarbonates were measured before and after heating at 300° C. for 12 minutes in the Tinius Olsen Plastometer. In the control experiments, no tetramethylammonium hydroxide or diphenyl carbonate was added. Results are set forth in Table IV.

TABLE IV

| Poly-carbonate | TMAH ppm | DPC wt % | Initial Mw (T/H ratio) | Final Mw (T/H ratio) | ΔMw (ΔT/H ratio) |
|---|---|---|---|---|---|
| Interfacial | | | | | |
| 3 | 0 | 0 | 54,961 (1.0) | 41,816 (1.5) | −24% (+50%) |
| 4 | 0 | 0 | 65,069 (1.1) | 46,721 (1.4) | −28% (+27%) |
| Re-distributed | | | | | |
| 3 | 180 | 8 | 28,498 (2.7) | 26,990 (2.9) | −5% (+7%) |
| 3 | 180 | 12 | 27,519 (3.1) | 26,307 (3.7) | −4% (+3%) |
| 4 | 90 | 0 | 41,746 (3.1) | 38,212 (3.7) | −9% (+19%) |
| 4 | 90 | 2 | 41,830 (2.7) | 39,390 (4.1) | −6% (+5%) |
| 4 | 135 | 0 | 38,726 (4.3) | 37,215 (4.4) | −4% (+2%) |

When the molecular weights and T/H ratios of the interfacially prepared polycarbonates are compared with the corresponding values of the redistributed polycarbonates, it is seen that the redistributed materials exhibit smaller changes in molecular weight and T/H ratio after heating in the Tinius Olsen Plastometer. This data indicate that the redistributed materials possess greater melt stability.

EXAMPLE 5

Various dry blends of a recycled bisphenol A polycarbonate having a weight average molecular weight of about 28,000, recovered from optical disks, and a bisphenol A polycarbonate having a molecular weight of about 180,000 were dried in a hot air oven at 125° C. for 4 hours. Tetramethylammonium phenoxide monohydrate was added in the amount of 540 ppm and the blends were extruded on a twin screw extruder at 300° C., with vacuum venting. There was obtained a series of redistributed products which had ductility properties essentially equivalent to those of the physical blends, and substantially lower melt viscosities. This is shown by the results in Table V, with the high molecular weight polycarbonate identified as "High MW PC".

TABLE V

| High Mw PC, % | Mw | Disper-sivity | % elonga-tion | Izod impact strength, joules/m. | Melt index, g./10 min. |
|---|---|---|---|---|---|
| Blends: | | | | | |
| 10 | 55,700 | 4.58 | 105 | 710 | 3.06 |
| 20 | 75,500 | 5.85 | 106 | 801 | 1.21 |
| 30 | 119,000/30,000 | * | 95 | 918 | — |
| 40 | 109,000/31,200 | * | 104 | 935 | 0.38 |
| 50 | 96,000 | * | 111 | 908 | — |
| Redistributed products: | | | | | |
| 10 | 32,200 | 2.82 | 44 | 256 | — |
| 20 | 40,800 | 3.55 | 80 | 657 | 4.02 |
| 30 | 43,400 | 3.51 | 84 | 705 | 2.42 |
| 40 | 45,900 | 3.61 | 107 | 742 | 2.10 |
| 50 | 51,100 | 3.26 | 138 | 774 | 1.39 |

EXAMPLE 6

Samples of a blow molding grade of branched bisphenol A polycarbonate having a weight average molecular weight of about 55,000, in which the branching agent employed was 1,1,1-tris(4-hydroxyphenyl)ethane, were combined with various proportions of tetramethylammonium phenoxide monohydrate, roller mixed for 5 minutes and extruded on a twin screw extruder at 260° C., with vacuum venting. Certain of the branched polycarbonate samples were first dried in a hot air oven at 125° C. for 4 hours. The molecular weights and dispersivities of the products are listed in Table VI, in comparison with a control which was extruded without addition of the redistribution catalyst.

TABLE VI

| Catalyst, ppm | Mw | d |
|---|---|---|
| Dried: | | |
| Control | 55,000 | 3.10 |
| 90 | 48.900 | 2.89 |
| 180 | 47,700 | 2.93 |
| 270 | 45,200 | 2.88 |
| Not dried: | | |
| 90 | 49,500 | 2.88 |
| 180 | 41,300 | 2.83 |
| 225 | 38,900 | 2.95 |

TABLE VI-continued

| Catalyst, ppm | Mw | d |
|---|---|---|
| 270 | 37,200 | 2.88 |

EXAMPLE 7

Blends of the recycled polycarbonate employed in Example 5 and the blow molding branched polycarbonate employed in Example 6 (identified as "Branched PC") were dried and extruded by the procedure of Example 6. The results are given in Table VII.

TABLE VII

| Branched PC, % | Catalyst, ppm | Mw | Dispersivity | % elongation | Izod impact strength, joules/m. | g./10 min. |
|---|---|---|---|---|---|---|
| Blends: | | | | | | |
| 90 | — | 51,300 | 2.97 | — | — | — |
| 80 | — | 48,600 | 2.75 | — | — | — |
| 70 | — | 46,500 | 2.96 | — | — | — |
| Redistributed products: | | | | | | |
| 90 | 270 | 36,700 | 2.94 | — | — | — |
| 90 | 180 | — | — | 143 | 758 | 5.1 |
| 80 | 270 | 35,900 | 2.75 | — | — | — |
| 80 | 180 | — | — | 145 | 748 | 11.8 |
| 75 | 270 | — | — | 129 | 726 | 19.0 |
| 70 | 270 | 37,100 | 2.95 | — | — | — |
| 70 | 180 | — | — | 737 | 146 | 15.0 |
| 50 | 45 | — | — | 140 | 780 | 18.4 |
| 50 | 90 | — | — | 150 | 742 | 22.0 |
| 50 | 180 | — | — | 123 | 684 | 25.0 |
| 50 | 270 | — | — | 111 | 710 | 32.0 |
| 40 | 270 | | | | 673 | 32.0 |
| 30 | 270 | | | | 192 | 47.0 |
| 20 | 270 | | | | 374 | 59.0 |
| 10 | 270 | | | | 85 | 80.0 |

EXAMPLE 8

The polycarbonates employed were a commercial bisphenol A polycarbonate (General Electric) having a weight average molecular weight of 65,900 and a copolycarbonate containing 72% (by weight) bisphenol A units and 28% 6,6'-dihydroxy-3,3,3',3'-tetramethyl-1,1'-spiro(bis)indane units, having a molecular weight of 107,000. A dry blend of equal weights of the two polycarbonates had a molecular weight of 65,400 and a bimodal glass transition temperature of 150°/207° C. The redistributed blend (conditions of Example 5, 100 ppm of tetramethylammonium phenoxide monohydrate as the catalyst) had a molecular weight of 58,500 and a glass transition temperature of 188° C.

What is claimed is:

1. A process for the redistribution of an organic polycarbonate composition comprising heating an initial linear or branched organic polycarbonate composition having a weight average molecular weight from 500 to 200,000 at a temperature in the range of about 180°-320° C., in a mixture which includes a carbonate redistribution catalyst in the amount of about 15-1000 ppm based on initial polycarbonate and in the absence of branching agents, thus forming a redistributed polycarbonate composition having a weight average molecular weight different from that of the initial polycarbonate.

2. The process of claim 1 wherein the initial organic polycarbonate composition has a weight average molecular weight ranging from about 5,000 to about 200,000.

3. The process of claim 1 wherein the initial organic polycarbonate composition is a non-branched, linear aromatic polycarbonate.

4. The process of claim 3 wherein the linear aromatic polycarbonate composition is composed of structural units of the formula:

$$-O-R-O-\underset{\underset{O}{\|}}{C}-, \qquad (I)$$

wherein at least about 60 percent of the total number of R groups are radicals of the formula:

$$-A^1-Y-A^2-, \qquad (II)$$

wherein each A1 and A2 is a monocyclic divalent aryl radical and Y is a bridging radical in which one or two carbon atoms separate A1 and A2, and wherein the remaining R groups are aliphatic, alicyclic or aromatic radicals.

5. The process of claim 4 wherein the polycarbonate is a bisphenol A polycarbonate.

6. The process of claim 5 wherein the polycarbonate is a recycled polycarbonate.

7. The process of claim 1 wherein the initial polycarbonate composition is branched.

8. The process of claim 1 wherein the initial polycarbonate composition is a mixture of linear and branched polycarbonates.

9. The process of claim 1 wherein the catalyst is a tetraalkylammonium base.

10. The process of claim 9 wherein the catalyst is a tetraalkylammonium hydroxide wherein each alkyl moiety has from 1 to about 16 carbon atoms.

11. The process of claim 9 wherein the catalyst is tetramethylammonium hydroxide pentahydrate or tetramethylammonium phenoxide monohydrate.

12. The process of claim 1 wherein said mixture also contains a diaryl carbonate in an amount up to about 1.5% based on initial polycarbonate.

13. The process of claim 12 wherein the diaryl carbonate is diphenyl carbonate.

14. The process of claim 1 comprising melt equilibrating in an extruder.

15. A process for the redistribution of a linear, aromatic polycarbonate composition comprising melt equilibrating in an extrusion device at least one initial linear aromatic polycarbonate having a weight average molecular weight in the range from about 25,000 to about 65,000 in the presence of a catalytic amount of a carbonate redistribution catalyst, with or without a diaryl carbonate in an amount no greater than about 1.0 weight percent based on the amount of initial polycarbonate, but in the absence of branching agents, at a temperature from about 250° C. to about 300° C. such that a redistributed aromatic polycarbonate is formed having a weight average molecular weight which is different from the starting weight.

16. The process of claim 15 wherein the carbonate redistribution catalyst comprises a tetraalkylammonium hydroxide.

17. The process of claim 16 wherein the polycarbonate is a bisphenol A polycarbonate.

* * * * *